United States Patent
Ratti et al.

(10) Patent No.: US 7,181,363 B2
(45) Date of Patent: Feb. 20, 2007

(54) THREE DIMENSIONAL TANGIBLE INTERFACE FOR INTERACTING WITH SPATIAL-TEMPORAL DATA USING A LASER SCANNER

(75) Inventors: Carlo Filippo Ratti, Turin (IT); Benjamin Tarquinn Fielding Piper, London (GB); Hiroshi Ishii, Boston, MA (US)

(73) Assignee: Massachusetts Institute of Technology, Cambridge, MA (US)

(*) Notice: Subject to any disclaimer, the term of this patent is extended or adjusted under 35 U.S.C. 154(b) by 384 days.

(21) Appl. No.: 10/825,701

(22) Filed: Apr. 16, 2004

(65) Prior Publication Data
US 2005/0017967 A1    Jan. 27, 2005

Related U.S. Application Data

(63) Continuation-in-part of application No. 10/696,474, filed on Oct. 29, 2003.

(60) Provisional application No. 60/463,357, filed on Apr. 17, 2003, provisional application No. 60/463,273, filed on Apr. 16, 2003.

(51) Int. Cl.
*G01B 5/02* (2006.01)
(52) U.S. Cl. .................... 702/159; 702/152
(58) Field of Classification Search ............ 702/152, 702/159
See application file for complete search history.

(56) References Cited

U.S. PATENT DOCUMENTS

| | | | |
|---|---|---|---|
| 5,661,667 A * | 8/1997 | Rueb et al. ............ 702/95 |
| 6,023,278 A * | 2/2000 | Margolin ............ 345/419 |
| 6,229,546 B1 * | 5/2001 | Lancaster et al. ............ 345/419 |
| 6,516,099 B1 * | 2/2003 | Davison et al. ............ 382/284 |
| 6,650,402 B2 * | 11/2003 | Sullivan et al. ............ 356/4.01 |
| 7,027,642 B2 * | 4/2006 | Rubbert et al. ............ 382/154 |
| 7,103,499 B2 * | 9/2006 | Goodwin et al. ............ 702/152 |
| 2002/0050988 A1 * | 5/2002 | Petrov et al. ............ 345/418 |
| 2002/0154812 A1 * | 10/2002 | Chen et al. ............ 382/154 |
| 2003/0154060 A1 * | 8/2003 | Damron ............ 703/2 |
| 2003/0187819 A1 * | 10/2003 | Gutierrez et al. ............ 707/1 |
| 2005/0031197 A1 * | 2/2005 | Knopp ............ 382/154 |
| 2005/0052714 A1 * | 3/2005 | Klug et al. ............ 359/3 |

* cited by examiner

*Primary Examiner*—John E. Barlow, Jr.
*Assistant Examiner*—Aditya S. Bhat
(74) *Attorney, Agent, or Firm*—Charles G. Call

(57) ABSTRACT

An interface that allows a user to model and analyze the properties of three dimensional surface and the regions surrounding such surfaces. The user manipulates a deformable physical modeling material that defines the geometry of a surface. A position sensor such as a laser scanner captures position data specifying the geometry of the surface. A processor processes the geometry data using a selected analysis function to produce result data representing computed characteristics of the surface or its surrounding region. The result data projected as an image onto the deformable surface. The interface permits the user to modify a surface geometry and directly visualize the characteristics of the modified geometry in real time.

20 Claims, 1 Drawing Sheet

_US 7,181,363 B2_

THREE DIMENSIONAL TANGIBLE INTERFACE FOR INTERACTING WITH SPATIAL-TEMPORAL DATA USING A LASER SCANNER

CROSS REFERENCE TO RELATED APPLICATIONS

This application is a continuation in part of U.S. patent application Ser. No. 10/696,474 filed on Oct. 29, 2003 and claims the benefit of the filing date thereof. This application also claims the benefit of the filing date of U.S. Provisional Patent Application Ser. No. 60/463,273 filed Apr. 16, 2003, and further claims the benefit of the filing date of U.S. Provisional Patent Application Ser. No. 60/463,357 filed Apr. 17, 2003. The disclosures of each of the foregoing applications is incorporated herein by reference.

FIELD OF THE INVENTION

This invention relates to systems for interacting with spatial data and more particularly to systems for modeling physical forms such as landscapes and exploring their characteristics by computational analysis.

BACKGROUND AND SUMMARY OF THE INVENTION

Landscape engineering typically deals with large land areas and requires the input of several specialists. These include experts in earth engineering, water management, agrarian management, land economy, legal policy and transport infrastructure to name just a few. Furthermore, landscape interventions inevitably affect large numbers of people living on or near a particular sight. It is often critical for the designers of a landscape project to communicate their vision to the local inhabitants. It is therefore desirable that the tools used by landscape designers and engineers allow various specialists and lay people to participate in a collaborative design process.

Engineers and designers involved in landscape, architectural and industrial projects continue to put great emphasis on the use of physical models, even though computer simulation techniques which provide virtual visualizations are increasingly available. Road engineers employ physical models to better understand complex topographies. Contemporary landscape designers often insist on using physical models (which may be later digitized) in the early stages of design exploration, in the same way that automobile designers still work extensively with physical, tape and clay models, even though they have access to sophisticated computer techniques for modeling curved-surfaces.

There is great efficiency in representing spatial constructs with physical, tangible models since physical models are themselves spatial constructs differing only in scale or material from the final outcome of a design. Physical models offer an intuitive understanding of complex geometries and physical relationships that are difficult, and sometimes impossible, to effectively describe in any other way.

On the other hand, computer based models, while commonly being limited to producing two-dimensional, visual representations, offer many advantages over the physical model. The dynamic quality of the screen allows computational systems to represent entities or forces that change over time. They offer a vast increase in the efficiency of production, reproduction and distribution of models. They also offer the ability to work directly with numeric data and at accuracies that far surpass the tolerances of most physical models.

The recent explosion in mapping, scanning and positioning technologies has led to a wealth of useful landscape data, including high-resolution topographical maps, information on soil types, population densities, variance in vegetation species and so forth. There has also been great progress in the methods used to analyze such data. Landscape designers and engineers are now able to simulate the results of their decisions using the power of computation.

Despite this progress, there has been relatively little development in the interface through which landscape based information is presented and manipulated. Most three-dimensional renderings and simulations are still viewed in two-dimensions on a computer screen or on paper. It is an object of the present invention to improve that interface.

Consider the following scenario: A group of road builders, environmental engineers and landscape designers stand at an ordinary table on which is placed a clay model of a particular site in the landscape. Their task is to design the course of a new roadway, housing complex and parking area that will satisfy engineering, environmental and aesthetic requirements. Using her finger, the engineer flattens out the side of a hill in the model to provide a flat plane for an area of car parking. As she does so, an area of yellow illumination appears in another part of the model. The environmental engineer points out that this indicates a region of severe land erosion caused by the change in the terrain and resulting flow of water. The landscape designer suggests that this erosion could be avoided by adding a raised earth mound around the car park. The group tests the hypothesis by adding material to the model and all three observe the affect on the process of erosion over time.

The scenario described above is one example of how the principles of the present invention may be applied to simulate dynamic characteristics by projecting computed representations of those characteristics directly onto the surface of a malleable three-dimensional physical model.

Others have sought human-computer interfaces that would better deal with three-dimensional forms, but the prevalent use of the two-dimensional computer screen has made it difficult to combine the benefits of physical and digital models in the same representation.

Frazier's Three-Dimensional Data Input Devices as presented in Computers/Graphics in the Building Process, Washington (1982) and more recently Gorbet's Triangles described by Gorbet, M., Orth, M. and Ishii, H. in "Triangles. Tangible Interface for Manipulation and Exploration of Digital Information Topography," Proceedings of Conference on Human Factors in Computing Systems (CHI '98), (Los Angeles, April 1998), ACM Press, 49–56, have explored approaches to parallel physical/digital interactions.

The Tangible User Interface described by Ullmer, B., and Ishii, H. in "Emerging Frameworks for Tangible User Interfaces," IBM Systems Journal 393, 3, 2000, 915–931, is being increasingly accepted as an alternative paradigm to the more conventional Graphical User Interface (GUI), where the ability to manipulate objects in space is more fully utilized.

Wellner's Digital Desk described by P. Wellner in "Interacting with Paper on the DigitalDesk," Communications of the ACM 36, 7, 86-96 (July 1993), illustrates the efficiencies of augmenting paper based office production with digital tools and methods for storage. Similarly Hinckley's neurosurgical interface described by K. Hinckley, R. Pausch, J. Goble and N. Kassell in "Passive Real-World Interface Props for Neurosurgical Visualization," Proceedings of Conference on Human Factors in Computing Systems (CHI '94), ACM Press, 452–458, uses a position tracked doll's head and knife to allow users to dissect a graphical representation of the brain.

There have also been a number of impressive developments in combined graphical/physical interactions. Systems such as the Phantom Arm offered by SensAble Devices, http://www.sensable.com/, when combined with virtual environments or holography as describe by W. J. Plesniak in "Haptic holography: an early computational plastic," Ph.D. Thesis, Program in Media Arts and Sciences, Massachusetts Institute of Technology, Cambridge, Mass., June 2001, allow for highly convincing interactions.

Special note is due to the work of John Underkoffler, called "The Urban Design Workbench," which directly inspired the approach used in the present invention, and was described by J. Underkoffler and H. Ishii in "Urp: A Luminous-Tangible Workbench for Urban Planning and Design," Proceedings of Conference on Human Factors in Computing Systems (CHI '99), Pittsburgh, Pa. USA, May 15–20, 1999, ACM Press, 386–393. The Urban Design Workbench uses digitally augmented tagged physical objects to represent buildings that can be rearranged to facilitate the process of urban design. Each of these approaches illustrates the enhanced interactions that are afforded by the use of tangible objects in human computer interaction. It is the goal of the present invention to combine the benefits of these approaches and provide an improved interface of practical value in the context of landscape analysis and other fields that offer similar challenges.

The present invention takes the form of a human-computer interface that computationally analyzes three-dimensional data using malleable physical representations, such as a deformable clay. A user of the interface directly manipulates the form of one or more physical objects while their changing geometry is captured in digital form and computationally analyzed in real time, and the results of the computation are projected back onto the physical surface of the manipulated objects. The interface contemplated by the invention takes advantage of a human user's natural ability to understand and manipulate physical forms while harnessing the power of computational analysis to visually display meaningful data on the surface of these forms.

The invention may be used to advantage in a variety of applications. As described in detail below, the invention may be used to particular advantage in architectural and landscape design by employing selected, available simulation techniques to evaluate physical characteristics of a modeled form (e.g. elevation, curvature, contours, shadow, water flows) to better understand the behavior of different structures and terrains under different conditions.

This invention offers an intuitive alternative for modeling and analyzing three-dimensional objects and forms, such as architectural and landscape models, where a mesh surface is automatically generated in real time according to the changing geometries of physical surfaces and used to update computational simulations. This approach allows users to quickly create and understand highly complex topographies that would be time consuming and require an inappropriate degree of precision if produced using mice and keyboards in conventional CAD tools.

The present invention differs from existing approaches that employ position-tracked objects to capture position, form and shape data by instead directly detecting the surface geometry of a malleable object or set of objects, creating a seamless interface that allows engineers and designers to simultaneously interact with physical and digital forms of representation.

The preferred embodiment of the invention described in detail below employs the combination of a laser scanner to capture the surface geometry of a user-manipulated, deformable object or set of objects which define a modeling surface, a processor for analyzing the captured surface geometry data in real-time to produce result data, and a video projector for illuminating the physical modeling surface of the deformable object or objects with a visual representation of the result data.

The physical model creates and conveys spatial relationships that can be intuitively and directly manipulated by the user's hands. This approach allows users to quickly define and understand highly complex topographies that would be time consuming and require an inappropriate degree of precision if produced using conventional CAD tools. This alternative vision makes better use of the user's instinctive abilities to discover solutions through the manipulation of physical objects and materials.

These and other features and advantages of the present invention may be more clearly understood by considering the following detailed description of a specific embodiment of the invention.

BRIEF DESCRIPTION OF THE DRAWINGS

In the detailed description which follows, frequent reference will be made to the attached drawings, in which.

DETAILED DESCRIPTION

The preferred embodiment of the invention performs real-time computational analysis of landscape models. It is to be understood, however, that the techniques employed are more broadly applicable to a variety of uses which benefit from the availability of a human-computer interface that enables the user to define geometric forms by manipulating a deformable surface to change its shape, and to directly visualize computed result data that is projected in real time onto the surface of the deformable surface. In addition to landscape design, the interface can be used to advantage in medical imaging, free-form architectural construction, fluid dynamics modeling, and many other domains that require an understanding of special and temporal factors manifested in three dimensional space.

When applied to the problem of landscape design, the specific embodiment described below, which is called "Illuminating Clay," allows a landscape designer to modify the topography of a clay landscape model while the changing geometry of the model is captured in real-time by a ceiling-mounted laser scanner. The captured elevational data that describes the surface of the model serves as input data for use with a library of landscape analysis functions that can be executed by a connected processor in real time, with the results of the analysis being projected back onto and registered with the surface of the model.

Figure 1:
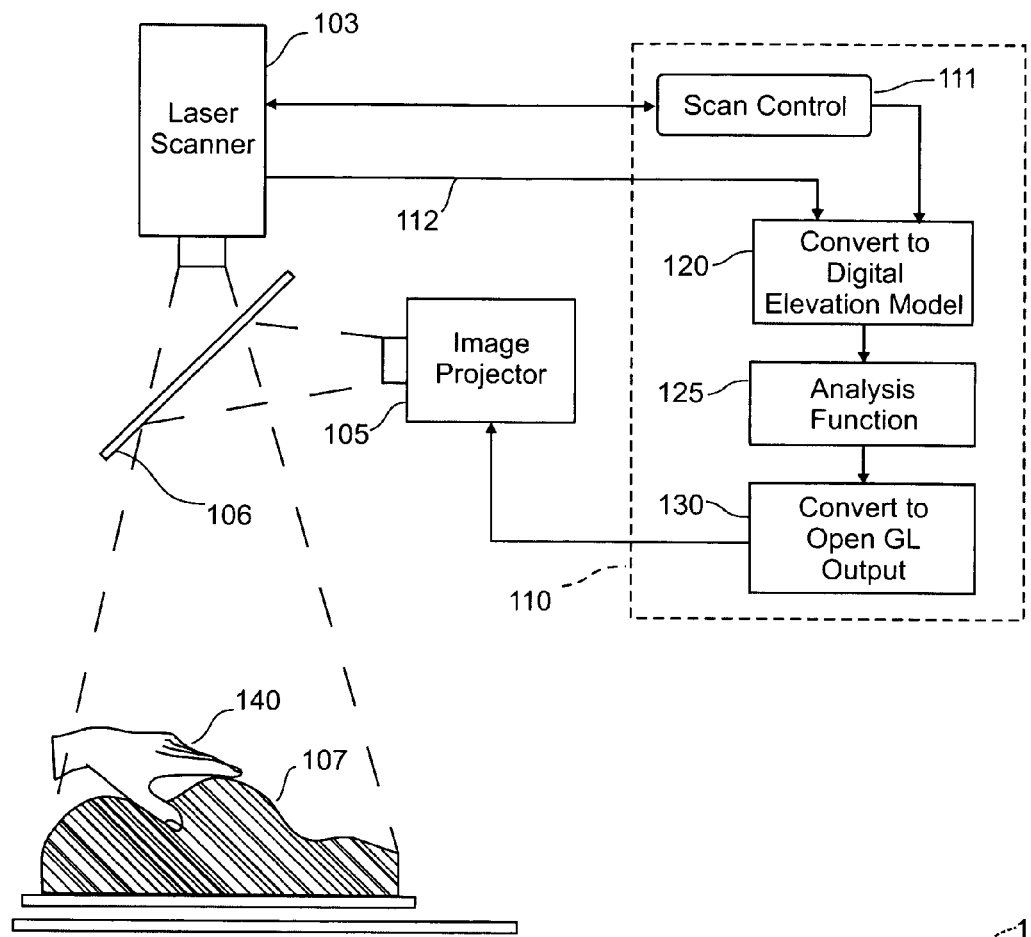
FIG. 1 is a schematic illustration of apparatus for scanning a deformable physical surface to produce surface geometry data, analyzing the geometry data to produce result data that describes the characteristics of the modeled surface or its surroundings, and projecting an image back onto the surface that represents the results of the analysis.

The principle components of a preferred embodiment of the invention are shown in FIG. 1 and these components may be summarized as follows:

The Physical Modeling Material

A malleable modeling material, seen at 107 in FIG. 1, is used to define the geometry of a surface. Different kinds of deformable materials (such as clay, plasticine, beads, cubic blocks, etc.) can be used and the particular material is chosen depending on the type of surface to be modeled and the manner in which the position of the surface geometry is measured. The material chosen must also provide a suitable surface upon which an image representing the result data can be projected. Plastic materials such as clay or plasticine that are easily shaped and, after being shaped, retain their shape, may be used to define a surface whose position is determined by a laser scanner. The physical modeling material may also consist of a glass beads which are individually movable, like the grains of sand in a sandbox, to define a surface whose geometry may be determined by optical measurements. Individually movable rectilinear blocks may be stacked in various ways to define a surface whose position may be determined using a laser scanner or other type of optical measurement.

We experimented with several different types of modeling material including Lego™ blocks, Fimo™ modeling clay, plasticine, Silly Putty™, un-dried porcelain clay and Crayola™ Model Magic™. We found that a thin layer of plastacine, supported by a fibrous core, combined the lightness and flexibility of a thin layer of material with the ductile qualities of the inner support that helped maintain a given topography. The matte white finish is highly suitable as projection surface and does not leave a residue on the user's hands. The Crayola™ Model Magic™ material, has a desirable foamy and malleable consistency, but its usefulness is limited by its tendency to harden with time.

A Three-Dimensional Position Sensor

A three dimensional sensor, such as the laser scanner seen 103, is required in order to capture the surface geometry of the physical modeling material. This sensor is preferably capable of capturing changes in the surface geometry in real-time, thereby allowing interactive exploration of the characteristics of the geometry by the user. The type of sensor selected may be dependent on the kinds of modeling material used as explained below. The laser scanner 103 may be implemented with a commercially available triangulation based laser scanner such as the Minolta Vivid-900 (VI900) available from the Instrument Systems Division of MINOLTA USA, 101 Williams Drive, Ramsey, N.J. to capture the surface geometry of the physical modeling material.

The Minolta Vivid 900 used to implement the scanner 103 was designed to perform single scans of static objects and scenes. In order to capture changes in the surface geometry of the modeling material in real-time, it is controlled by the connected processor to repeatedly scan the surface of the material. A scan control routine indicated at 111 in FIG. 1 is executed by the same processor, shown generally at 110, which places the position data in standard form as a Digital Elevation Model. This is allows 320×240 point values to be captured every 0.3 seconds, resulting in a near-real-time capture of the geometry of the upper surface of the modeling material 107. This scanned data output at 112 is processed to form data defining the x, y and z coordinates of the modeling material's surface. The combination of a ceiling mounted laser scanner 103 and video projector 105 (described below), together with the angled mirror 106 by which the scanner and projector are aligned at the same optical origin so that the two devices are calibrated to scan and project over an equal area, can form a self contain I/O device that can be installed above any desired workspace.

The Vivid 900 Minolta triangulation laser operates by projecting a near infrared laser stripe over the model surface 107. Distortions in the shape of this stripe are captured by a camera (not shown) mounted in the scanner, which is offset by a known distance from the source of the laser stripe. The distortions in the stripe are analyzed by the Minolta firmware and converted, through triangulation, into distance information. While we considered many alternative approaches for real-time 3d capture, the laser triangulation approach was chosen because it offered a much faster scan rate than time-of-flight laser scanners and offered greater accuracy than multiple camera based systems. The triangulation scanner allowed color and geometry to be captured simultaneously and offered an advanced software developer's kit to provide a software interface for scan control commands from the processor and for output surface measurement data transmitted to the processor.

A Data Processor

A conventional computer may be used perform the functions depicted within the dashed line rectangle 110. The processor controls the scanning by performing a control routine as seen at 111 to produce data indicating the current position of the physical surface. The processor then preferably converts that data into a standard form such as a Digital Elevation Model (DEM) as indicated at 120, processes the surface geometry data using one or more appropriate analysis functions as seen at 125, and converts the result data into suitable standard graphical format, such as OpenGL, to and identify the subset of voxel values that are intersected by the physical surface geometry as seen at 130.

The VI 900 scanner 103 is designed to perform single scans of static objects and scenes. In order to capture the changing geometry of the workspace in real time, a control script seen at 111 is executed by the processor 110 to perpetually scan the modeling surface 107. Using the control script, the modeled surface is repeatedly scanned to capture 320×240 points in 0.3 seconds. The transfer of this data from scanner 103 to the processor 110 via a SCSI interface seen at 112 adds an additional component to the scan cycle time. The transfer time may be reduced by discarding all color information and function 'SCSIReadPitch' provided with the scanner's software development kit to transfer only the range data. The range image is converted into x, y, z coordinates using the provided SDKII function 'SCSIReadData', and then finally converted at 120 into a Digital Elevation Model, a raster map that represents the altitude of each pixel as a color value and facilitates processing by an analysis routine selected from an available library. This DEM is then input to a selected standard landscape analysis functions as seen at 125 (discussed below) which further reduce the scan cycle. The arrangement described typically employs a scan cycle that ranges between 0.9 and 1.5 Hz depending on the complexity of the analysis function. Thus, as the modeling surface is reshaped by hand as seen at 140 in FIG. 1, the new shape is analyzed and the result data is projected back onto the modeling surface with a delay of approximately one second, allowing the effects of the new shape to be immediately visualized in substantially real time.

An Image Projector

The image projector as seen at 105, which may take the form of a conventional LCD, CRT or DLP video projector of the type used to display computer generated graphical data, is employed to project color (or gray-scale) pixel data representative of the result data produced by the processor back onto the surface of the physical modeling material and onto a surrounding projection surface provided by platform 151. The video projector 105 is calibrated with the three-dimensional sensor 103 to allow projected pixel values to correspond with points on the surface 107. The type of projector used is partially dependent on the three-dimensional sensing technique chosen to capture the surface geometry measurements. The projector 105 may take the form of a standard Mitsubishi 640×480 LCD projector which casts the result of landscape analysis functions back on to the surfaces of the physical model 107. LCD projection was found to cause less interference with the laser scanner than DLP projectors which use compact mirror arrays.

The video projector 105 can be positioned with the laser scanner 103 above the physical modeling material seen at 107. In the configuration shown in FIG. 1, the laser scanner 103 and the image projector 105 are located at the same optical origin to avoid problems of shadowing, occlusion and image distortion. This is achieved using a coated mirror 106 that is transparent to light from the laser scanner 103 and reflective of the visible spectrum from the projector 105, as explained in U.S. Provisional Patent Application Ser. No. 60/463,273 filed Apr. 16, 2003. However, tests have shown that, from a distance of 2 meters and with an operating volume of approximately 0.5×0.5×0.5 m, the maximum extent of the phoxel space occupied by the surface of the modeling material 107, a simpler arrangement in which the projector and scanner are positioned along side each other performs adequately since the scanned and projected rays can be considered to originate from the same source. The scanner/projector pair may thus both be housed inside a casing (not shown) at a height of approximately 2 meters above the surface of the modeling material 107.

The laser scanner 103 determines the geometric position of the surface of the modeling material 107 with a high degree of accuracy and allows any opaque non-reflective material to be used as a modeling medium. The scanner 103 and the image projector 105 should be calibrated to ensure that the spatial coordinates of the surface of the material captured by the scanner correspond precisely with correct voxel values represented by the image pixels projected onto the surface.

Standard Data Formats and Analysis Routines

The Digital Elevation Model data created at 120 is a digital representation of a topographic surface that takes the form of a regular grid of spot heights. The DEM data is an array of values each of which specifies the elevation of the topographic surface at a particular location in two-dimensional array of locations. The DEM is the simplest form of standard digital representation of topography and is used by the U.S. Geological Survey. DEM data can be processed using available analysis functions to determine the attributes of a terrain, such as its elevation, slope and aspect at any point. In addition, the DEM data can be processed in standard ways to find features on the terrain, such as drainage basins and watersheds, drainage networks and channels, peaks and pits and other landforms.

The present invention may accordingly be used to model an existing or modified landscape and to display its attributes on the modeled terrain. For example, the principal components of a drainage basin are its topographic form and the topologic structure of its drainage network. The quantification of these components is tedious and time consuming when accomplished manually. Using the invention, the drainage characteristics of landscape, and the manner in which those characteristics can be varied by altering in the shape of the terrain model, may be explored in real time with the results being visually displayed in three-dimensions in an readily understandable way.

Specific standard analysis functions which are of value to the landscape designer and can be performed at 126 include the following:

Slope Variation & Curvature Analysis. A thorough understanding of the slope and curvature of landscape topography is extremely important in almost all landscape analysis. For example slope gradients affect the positioning of roads, building, power-lines and so forth. The absolute value of this function returns the slope at a given point in the topography. The slope value can be displayed on the model using a color map ranging from red to purple, where the two extremes correspond to the maximum and minimum slope values.

Shadows & Solar Radiation Analysis. By processing the DEM data, the processor can simulate the positions of shadows in the landscape. Shadow angles are calculated for a given sun position and are projected onto the model as black and white image. By changing this sun position over time it is possible to view lighting conditions through the passage of a day or year. It also becomes possible to determine the total amount of solar radiation at a given point on a site of known latitude and longitude. This kind of information may, for example, help the user to position crops, housing complexes, solar energy collectors and other sunlight affected insertions in the landscape. These values can be integrated to form isolines, which can also be projected onto the model. The shadow algorithm was developed by Ratti and Richens as described in "Urban texture analysis with image processing techniques," Proceedings of CAADFutures99 (Atlanta, GE, May 1999) The total solar exposure algorithm was adapted from the GRASS GIS (Geographic Resources Analysis Support System) open source, Geographical Information System (GIS) library with raster, topological vector, image processing, and graphics production functionality which is generally available under GNU licensing on the World Wide Web.

View Shed. It is often crucial to know the precise C from any given position in the landscape. This field of view is known as the view shed and this landscape analysis can be performed by passing the DEM through an image-processing algorithm that generates the areas that are visible based on a point in the model selected by the user. Applications are varied, from helping to decide the positioning of line-of-sight telecommunication devices (such as a microwave transceivers) to the passage of routes that maximize or minimize views (scenic paths or the construction high ways that pass areas of housing).

Least cost of passage. This analysis function can help the user determine the most appropriate positioning of a roadway or path, since it indicates trajectories on the landscape that minimizes the cost of passage. This cost can be calculated to take into account different parameters such as the actual cost of construction or the cost in time taken to complete a particular route. In addition information relating to the necessary volume of cuts and fills on the landscape can be calculated and displayed in real time for the benefit of the user.

Water flow and land erosion. The representation of water flow and erosion in the landscape helps the user in sitting housing complexes, dams, roads or other interventions while visualizing the (often non-intuitive) consequences of these interventions. In particular, our land erosion algorithm can show the amplified effects of small modifications in the landscape and was adapted from the open source GRASS library.

These and other routines for processing DEM data are described, for example, in Terrain Analysis: Principles and Applications edited by John P. Wilson John C. Gallant, John Wiley & Sons; 1st edition (2000) ISBN: 0471321885 and in Digital Elevation Model Technologies and Applications: The DEM Users Manual edited by Dave F. Maune, Asprs Publications (2001) ISBN: 1570830649.

As illustrated at 130, the result data from the surface analysis function performed at 125 is preferably converted into standard OpenGL form at 130 for projection onto the work surface 107 by a conventional projector 105. OpenGL is a widely used and supported 2D and 3D graphics application programming interface (API) that incorporates a broad set of rendering, texture mapping, special effects, and other powerful visualization functions. See OpenGL Programming Guide: The Official Guide to Learning OpenGL, Version 1.4, Fourth Edition by the OpenGL Architecture Review Board, Addison-Wesley Pub Co (2003) ISBN: 0321173481, and http://www.opengl.org.

Thus, by capturing surface position data into standard DEM format at 120, it is possible to analyze the characterizes of the modeled surface using standard analysis functions at 125. By placing the results of this analysis into standard OpenGL format as seen at 130, the result data can be rendered using standard OpenGL visualization, animation and rendering functions and displayed in three dimensions onto the model surface.

Work Table and Output Displays

Figure 2:
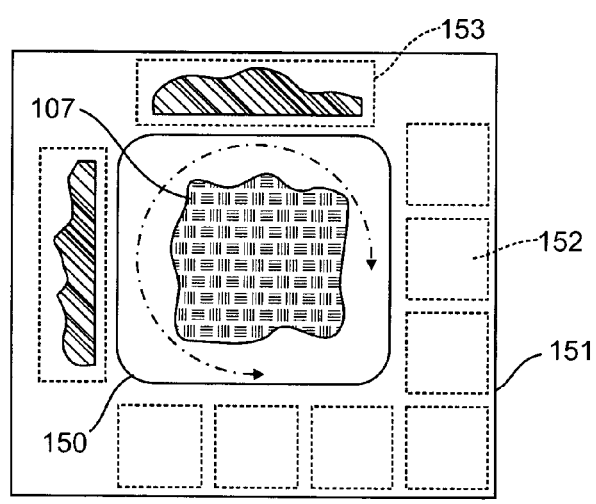
FIG. 2 is an overhead plan view of the work surface and display area employed in the embodiment of FIG. 1.

As shown in the overhead view of FIG. 2, the modeling material 107 is preferably supported on a rotatable turntable 150 above a platform 151 which provides a smooth white surface suitable for projection and a platform onto which the turntable 150 is placed. This turntable 150 can be rotated to the desired viewing angle. Two sides of the surface provided by the platform 151 are illuminated with thumbnail images as illustrated at 252 from a library of landscape analysis functions. These thumbnails remain actively displayed, updating with changes in the model shape, allowing the easy comparison of different landscape analysis results. The remaining two edges of the work surface of platform 151 are used to project cross sections of the model as illustrated at 153, enhancing the user's three-dimensional understanding of the terrain.

A visible cursor moved by a mouse may be used to select points on the model, and quantitative information relating to the points on the model selected by the mouse may be displayed at the corners of the platform 151. These variables dynamically adjust according to the simulation function that is currently in use. For example the displayed numbers indicate factors such as "Slope: 64", "Water Shed: 22.3 mm" and "Erosion: 7.4 mm/year" depending on the current landscape analysis function.

The graphical elements projected onto the platform surface are preferably positioned around the periphery of the platform 151 to allow users to approach it from all sides, promoting collaborative use by several participants in the design process.

Operating Modes

The preferred embodiment of the invention described above can operate in three different modes, called "SCANcast," "CUTcast" and "CADcast."

The SCANcast mode is the default operating mode for the system and, as described above, allows the geometry of a given physical form to be scanned to obtain input data which is then analyzed and the analysis results are projected back onto the form surface.

While the SCANcast mode offers the ability to display information on the surface of a three-dimensional model, it does not allow three-dimensional information relating to conditions above or below the surface of the model to be displayed. For example, the SCANcast mode does not provide a means to represent airflow, temperature gradients or subterranean geological formations to be displayed on the model. If, for example, the designer of a wind farm wishes to know the precise wind speed at a point three meters above the surface of the landscape, they need to insert a surface for projection three meters above the surface of the model topography. However, by adding that surface to the landscape scene they are affecting the geometry of the model and therefore altering the simulated wind speed at the very point the wish to measure.

The CUTcast operating mode solves this problem by offering the user the ability to "freeze" the geometry of a given scene or landscape for the purposes of 3-dimensional simulation. The user is then free to add surfaces for projection at will, and to 'cut' through any portion of the simulation with out affecting the results. Any surface can be used to make this cut, whether it is the modified surface configuration of the model, the surface of a stiff sheet of translucent plastic or cardboard, or indeed a more complex form such as a sphere or even the user's hand.

In the CUTcast mode, the deformable surface is first used to define the geometry of a physical form to be modeled. This first surface is scanned to provide input data which is then processed to generate a three-dimensional voxel dataset which describes the characteristics of the space surrounding the surface. The shape of the deformable surface is then altered to define a second surface which acts as a "cutting surface" to identify data values within the voxel dataset which are then displayed on second surface. The processor generates the voxel dataset representing the characteristics of the first modeled surface and a three dimensional region surrounding said surface, and then the scanner is used to measure the position of a second cutting surface which selects a portion of said voxel dataset defined by the position of the cutting surface relative to said original modeling surface.

The CUTcast mode employs the principles described in U.S. patent application Ser. No. 10/696,474 filed on Oct. 29, 2003 by Carlo Ratti, Benjamin Piper, Yao Wang and Hiroshii Ishii entitled "Methods and apparatus for visualizing volumetric data using a deformable physical object." As explained in that application, the disclosure of which is incorporated herein by reference, a physical modeling surface may be manipulated to enable a user to intuitively explore and visualize complex three dimensional datasets by manipulating the position and shape of the modeling surface. By altering the shape of the physical material, the user selects the geometry of a free form surface that is used as a cutting surface to intersect a voxel dataset. The intersected voxel values are then converted to image data that is projected back onto the surface of the physical material. In the SCANcast mode, the present invention may be used to model a given geometry to create a voxel dataset describing the three dimensional space that surrounds the model, and then, in the CUTcast mode, the modeling surface may be again altered to define a cutting surface that defines a different geometry spaced from the first surface that allows the user explore the characteristics of the model at locations near to but spaced from the first surface that defined the physical geometry being modeled.

The third mode of operation, CADcast, is used to facilitate the creation of a modeling surface that accurately portrays a desired landscape site or other form. The modeling and analysis of a physical structure may require the production of an accurate scale model of that structure. However, constructing this model in an accurate and efficient manner may could be difficult and time consuming. The CADcast mode allows the user to make precise three-dimensional models using standard materials such as clay or plastacine. The CADcast mode operates by comparing the scanned position of the modeling surface with a desired topography stored in computer memory as a 'CAD' (Computer Aided Design) file or DEM data. This source of this computer model could range from photogramtry data purchased from GIS sources, may be generated from the traced contour lines of conventional topographic maps, or may be produced by a variety of existing CAD tools.

In the CADcast mode, the user places a deformable material such as clay material into the workspace. The current surface geometry is scanned, compared with the desired surface geometry, and then each position on the modeling surface is illuminated with a color indicating when it is within or outside the volume of the CAD model. By varying this color, for example from purple to yellow inside the volume and from orange to blue outside the volume, the CADcast mode indicates the level of disparity between the physical and CAD models. Thus, if an area of the physical model is highlighted in orange, the person shaping the modeling surface is informed that the area is outside the volume of the digital model and is relatively for from being accurately registered. As material is removed from the model the color of the surface becomes progressively bluer until the surface of the physical model and digital model are the same. At this point there is a discreet change to the color red to indicate that a match within acceptable tolerances between the surface of the physical and digital models has been reached. The CADcast mode accordingly permits the user to rapidly construct accurate models that accurately match digital models of existing landscapes or other physical structures.

CONCLUSION

It is to be understood that the specific methods and apparatus described above are merely illustrative applications of the principles of the invention. Numerous modifications may be made to these methods and the apparatus without departing from the true spirit and scope of the invention.

What is claimed is:

1. Apparatus for modeling and evaluating the characteristics of three-dimensional forms which comprises, in combination,
   a deformable material that may be easily manually shaped to define a surface that can be shaped and once shaped retains its shape,
   means for measuring the position of said surface to produce a three-dimensional surface geometry data,
   means for processing said surface geometry data to generate result data which specifies one or more characteristics of said surface at different points on or near said surface, and
   means for projecting a visible image corresponding to said result data onto said surface.

2. Apparatus for modeling and evaluating the characteristics of three-dimensional forms as set forth in claim 1 wherein said deformable material is supported on a rotatable turntable.

3. Apparatus for modeling and evaluating the characteristics of three-dimensional forms as set forth in claim 1 wherein said deformable material is selected from a group consisting of clay, putty, plasticine, beads, and rectilinear blocks.

4. Apparatus for modeling and evaluating the characteristics of three-dimensional forms as set forth in claim 1 wherein said deformable material is a plastic material.

5. Apparatus for modeling and evaluating the characteristics of three-dimensional forms as set forth in claim 1 wherein said means for measuring is a three-dimensional optical distance measuring device.

6. Apparatus for modeling and evaluating the characteristics of three-dimensional forms as set forth in claim 1 wherein said means for measuring is a laser scanner.

7. Apparatus for modeling and evaluating the characteristics of three-dimensional forms as set forth in claim 6 wherein said laser scanner is a triangulation based laser scanner that includes means for directing laser light at different positions on said surface and means for converting reflected laser light from said surface into said surface geometry data.

8. Apparatus for modeling and evaluating the characteristics of three-dimensional forms as set forth in claim 6 wherein said means for projecting a visible image corresponding to said result data is located at the same optical origin as said laser scanner.

9. Apparatus for modeling and evaluating the characteristics of three-dimensional forms as set forth in claim 8 further including a coated mirror through which said laser scanner illuminates said surface and which reflects said visible image from said projector onto said surface so that said laser scanner and said means for projecting have the same optical origin.

10. Apparatus for modeling and evaluating the characteristics of three-dimensional forms as set forth in claim 1 wherein said means for measuring the position of said surface operates repeatedly to remeasure the position of said surface to provide said surface geometry data in real time as said deformable material is reshaped or moved.

11. Apparatus for modeling and evaluating the characteristics of three-dimensional forms as set forth in claim 10 wherein said means for processing generates changing result data in real time as said surface geometry is reshaped or moved, and said means for projecting a visible image is a video projector that displays a changing image corresponding to said changing result data.

12. Apparatus for modeling and evaluating the characteristics of three-dimensional forms as set forth in claim 1 wherein said means for processing said surface data comprises means for translating said surface geometry data into a standard geometry format and means for selecting and executing an analysis routine from a library of available analysis routines for processing said data in said standard geometry format to generate said result data.

13. Apparatus for modeling and evaluating the characteristics of three-dimensional forms as set forth in claim 12 wherein said means for processing further comprises means for representing said result data in a standard graphical display format and for thereafter processing said result data in said standard graphical display format into Image data supplied to said means for projecting a visible image corresponding to said result data onto said surface.

14. Apparatus for modeling and evaluating the characteristics of three-dimensional forms as set forth in claim 12 wherein means for processing includes means for generating different sets of result data using corresponding ones of said available analysis routines, and wherein said means for projecting projects a plurality of visible images concurrently, each of which corresponds to one of said sets of result data, whereby a user can simultaneously view different characteristics of said surface.

15. Apparatus for modeling and evaluating the characteristics of three-dimensional forms as set forth in claim 1 wherein said means for processing further comprises means for representing said result data in a standard graphical display format and for thereafter processing said result data in said standard graphical display format into image data supplied to said means for projecting a visible image corresponding to said result data onto said surface.

16. Apparatus for modeling and evaluating the characteristics of tbree-dimensional forms as set forth in claim 1 wherein said surface geometry data comprises an array of values each of which specifies the elevation of said surface at a particular location in two-dimensional array of locations.

17. Apparatus for modeling and evaluating the characteristics of three-dimensional fonns as set forth in claim 16 is conforms to the Digital Elevation Model for representing topographical data.

18. Apparatus for modeling and evaluating the characteristics of three-dimensional forms as set forth in claim 17 wherein said means for processing said surface geometry data comprises means for selecting and executing a routine in a library of routines for processing Digital Elevation Model (DEM) data into result data.

19. Apparatus for modeling and evaluating the characteristics of thee-dimensional forms as set forth in claim 18 wherein said surface is a topological landscape surface and wherein said library includes for generating result data which specifies characteristics of said surface selected from a group consisting of: slope, curvature, shadowing, solar radiation, field of view, cost of passage, water flow and land erosion characteristics.

20. Apparatus for modeling and evaluating the characteristics of three-dimensional forms as set forth in claim 1 further comprising means for storing said result data as a voxel dataset representing the characteristics of said surface and a three dimensional region surrounding said surface, means for measuring the position of a second surface, and means for projecting a visible image corresponding to a selected portion of said voxel dataset defined by the position of said second surface relative to said first surface.

* * * * *